Feb. 4, 1969　　　　W. LINGWOOD　　　　3,425,665
GAS TURBINE ROTOR BLADE SHROUD

Filed Feb. 24, 1966　　　　Sheet _1_ of 3

INVENTOR
WILLIAM LINGWOOD
BY
ATTORNEY

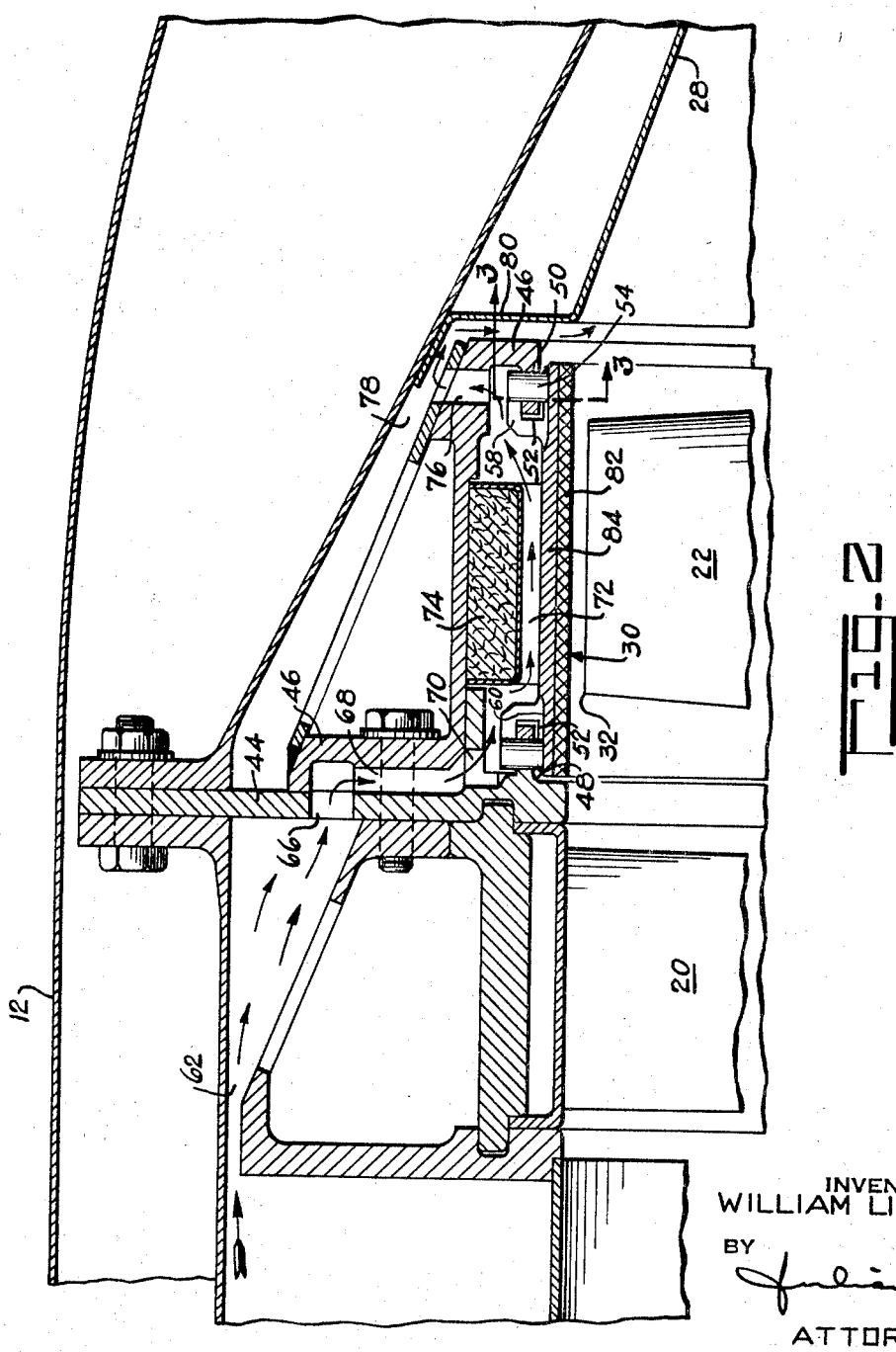

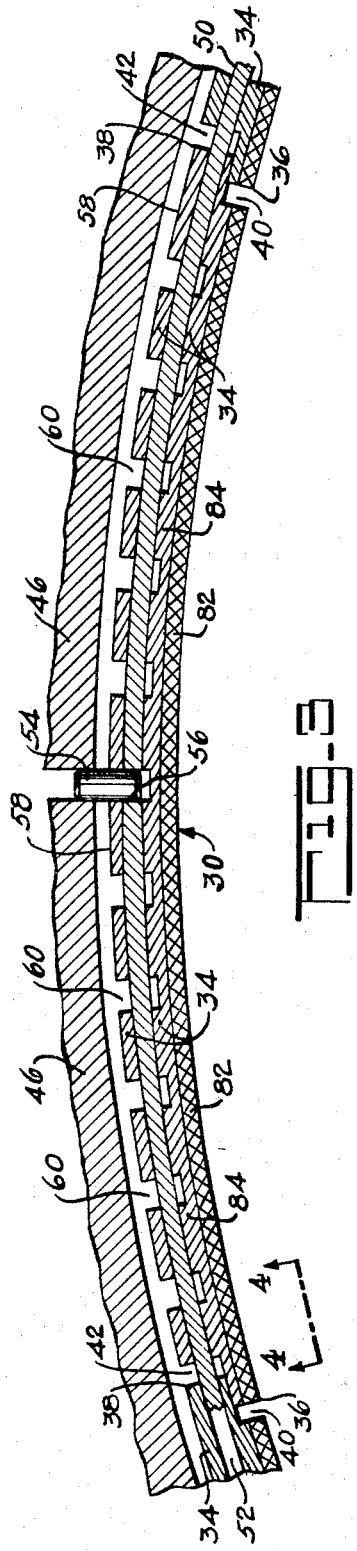
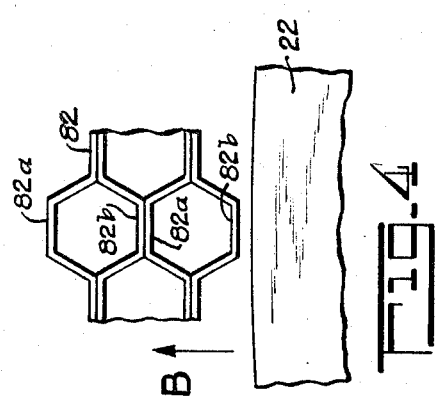
INVENTOR.
WILLIAM LINGWOOD
BY
ATTORNEY

United States Patent Office 3,425,665
Patented Feb. 4, 1969

3,425,665
GAS TURBINE ROTOR BLADE SHROUD
William Lingwood, Weehawken, N.J., assignor to Curtiss-Wright Corporation, a corporation of Delaware
Filed Feb. 24, 1966, Ser. No. 529,762
U.S. Cl. 253—39      2 Claims
Int. Cl. F01d 5/08, 5/18, 25/12

ABSTRACT OF THE DISCLOSURE

A segmented shroud for the blades of a gas turbine rotor, allowing circumferential expansion of the shroud but restraining radial expansion, and obviating seizure of the blade tips from radial expansion of the blades.

---

This invention relates to gas turbine engines and is particularly directed to an improved rotor blade shroud structure for such engines.

The efficiency of the turbine stage in gas turbine engines can be materially increased by minimizing the leakage of gases between the tips of the turbine blades and the surrounding shroud structure. It is desirable to provide as small a clearance as is possible between the shroud structure and the rotor blade tips in order to minimize energy losses through gas leakage. However, in gas turbine engines particularly those operating at relatively high temperatures in the turbine section, such as in the range of 2500° F., sufficient clearance must be provided between the shroud structure and the rotor blade tips in order to prevent seizure of the rotor blades with the shrouding which may be caused by the difference in the relative rates of thermal expansion between the rotor blades and rotor disc and the surrounding shroud. Further, conventional shrouding of the rotor blade tips, which may comprise a rigid casing structure surrounding the rotor blade tips, is subject to thermal growth in the radial direction relative to the engine axis so that, during operation of the engine, the clearance between the shroud structure and the rotor blade tips will increase from that which is present when the engine is relatively cold. Thus, it has been found to be difficult in the past to provide a rotor blade shroud structure which will provide minimum clearance between the rotor blade tip and the shroud during all phases of engine operation and at the same time prevent seizure of the rotor blades with the shroud structure during relative thermal expansion of the rotor blades and disc or rotor assembly.

It is a prime object of the present invention to provide a novel and improved rotor blade shroud structure in which there is substantially no radial expansion of the shroud and in which means are provided in the shroud structure to compensate for the relative thermal expansion of the rotor assembly so that seizure of the rotor blades with the shroud structure is prevented. The invention is generally carried out by providing a segmented annular shroud structure which is so constructed so as to permit thermal expansion between the ends of the individual shroud segments so that each segment is permitted to grow circumferentially due to thermal expansion while avoiding expansion in the radial direction. The annular inner surface of the shroud structure is so constructed that the rotor blade tips, during relative thermal expansion, may rub against said inner surface without resulting in the blades seizing on said surface. Since the relative expansion of the shroud can be controlled through the structure of the present invention, it will be apparent that the clearance between the blade tips and the surrounding shroud structure can be kept at a minimum thus maintaining a relatively highly efficient turbine structure.

Accordingly, it is one object of the invention to provide a novel and improved rotor blade shroud structure for a gas turbine engine.

It is another object of the invention to provide a novel and improved shroud structure for the rotor blades in a gas turbine engine wherein a minimum clearance between the rotor blade tips and the surrounding shroud structure is maintained during relatively high temperature operation.

It is a further object of the invention to provide a novel and improved shroud structure for the rotor blade tips wherein relative rubbing contact between the rotor blade tips and the surrounding shroud structure can be carried out without seizure of the blade tips with said shroud structure.

It is an additional object of the invention to provide a novel and improved shroud structure for the rotor blade tips wherein radial expansion of the shroud structure relative to said rotor blade tips is restrained so that relative expansion in the radial direction between the surrounding shroud structure and said rotor blade tips is minimized.

Other objects and advantages of the invention will be best understood upon reading the following detailed description with the accompanying drawings wherein:

FIG. 2 is an enlarged partial sectional view of the turbine section showing the invention;

FIG. 3 is a sectional view taken along line 3—3 of FIG. 2; and

FIG. 4 is an enlarged view showing the inner surface of the shroud and a portion of a turbine blade being shown with its path of travel relative to the inner surface of the shroud structure.

Figure 1:
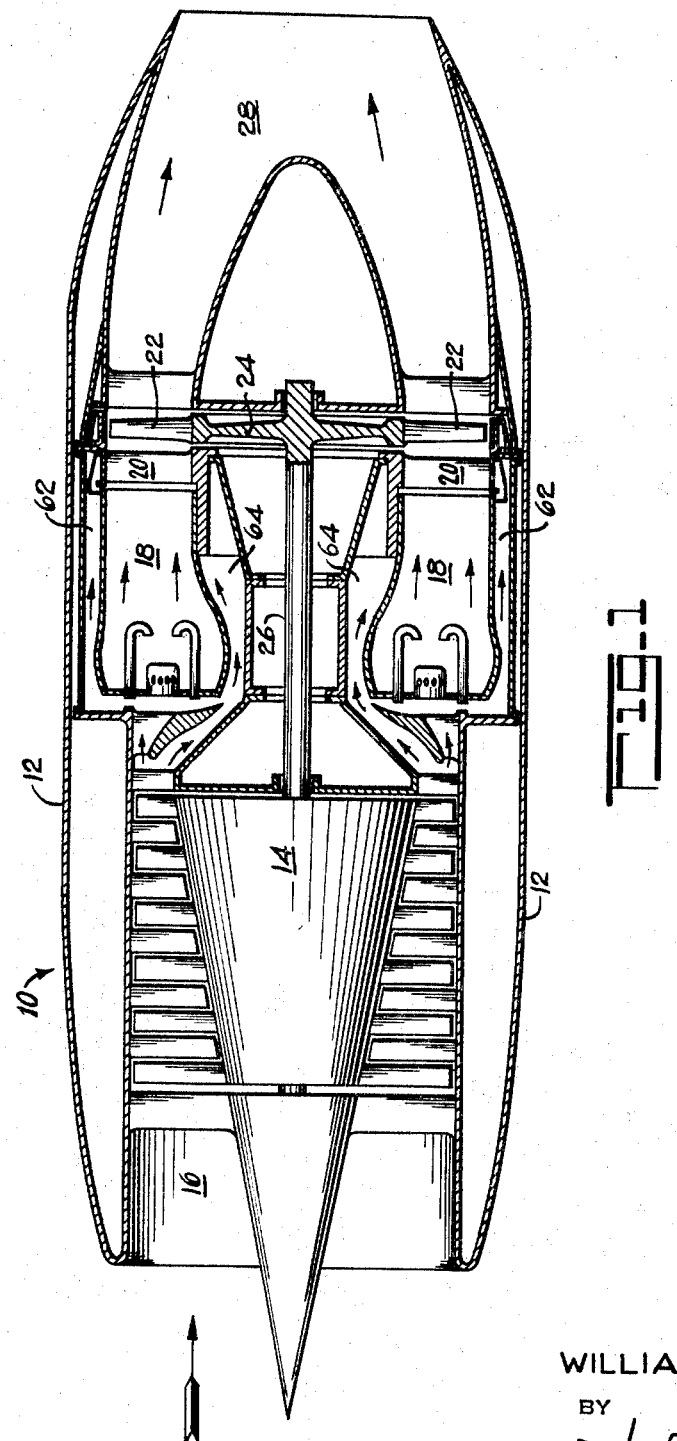
FIG. 1 is an axial sectional view of a gas turbine engine of the type embodying the invention.

Referring to the drawing, in particular FIG. 1, a gas turbine engine is schematically indicated by reference numeral 10 as comprising a duct-like housing 12 having an air compressor 14 journalled within said housing adjacent to its forward or upstream end. The air compresor 14 receives air through an annular air inlet 16 with the compressor being operative to deliver the compressed air to the combustion chamber unit 18.

The air is combined with fuel in the combustion chamber 18 and the resulting combustion gases are directed by nozzle guide vanes 20 disposed at the downstream end of the combustion unit to the rotor blades 22 of the turbine rotor 24 for driving said rotor. The guide vanes 20 are disposed at an angle relative to the turbine rotor blades 22 so that the gases have a component in the direction of rotation of the turbine rotor blades 22. A shaft 26 is drivably connected between the turbine rotor 24 and the compressor 14 so that the gases passing through the turbine drive said turbine which in turn drives compressor 14. The combustion gases are discharged rearwardly from the turbine blades 22 into the surrounding atmosphere through an exhaust nozzle section 28 whereby the gas turbine engine is provided with a forward propulsive thrust. The structure so far described in relation to the gas turbine engine 10 is conventional.

It is well known in the gas turbine art that excessive clearances between the rotor blade tips of the turbine rotor blades and their surrounding shroud structure promote energy losses and result in poor operating efficiency. In gas turbine engines operating at relatively high temperatures such as in the range of 2500° F., it is often difficult to maintain a minimum clearance between the rotor blade tips and the shroud structure due to the relative rates of thermal expansion of these elements. It is desirable to prevent any thermal expansion in the radial direction of the annular shroud structure so that the shroud clearance does not increase relative to the rotor blade tips during engine operation. However, at the same time, because there will be some radial growth of the rotor blades and disc due to thermal expansion, means must be provided for preventing seizure of the rotor blades with the surrounding shroud structure.

The present invention provides a novel shroud structure which substantially eliminates the aforementioned problems. Referring to FIGS. 2 and 3 in particular, an annular shroud 30 is disposed in surrounding relationship with the tips 32 of the turbine rotor blades 22. The annular shroud 30 is composed of a plurality of arcuate segments 34 disposed in end-to-end arrangement in an overlapping or dovetailing fashion. As seen in FIG. 3, each segment 34 has one circumferential end 36 formed with an upper or radially outer shroud portion cut away and an opposite end 38 with a lower or radially inner shroud portion cut away. When the segments 34 are disposed in end-to-end relationship, an end 38 of one segment 34 overlaps an end 36 of an adjacent segment 34 but with the end faces of each segment 34 being spaced from the end faces of its adjacent segment 34 to leave gaps or spaces 40 and 42 between the adjacent end faces. The purpose of the gaps 40 and 42 will be more clearly explained hereinafter.

Referring to FIG. 2, the walls 44 and 46 of the outer body in the turbine region of the engine are each respectively provided with a rail structure 48 and 50 for supporting each shroud segment 34 by means of slots 52 formed in each axial end face of each of the segments 34 for receiving the rail structure 48 and 50. The structure comprising rails 48 and 50 and the slots 52 in the shroud 30 serves to restrain the shroud structure from radial movement relative to the turbine blade tips 32. As seen in FIG. 3, each segment 34 is also pinned at its center by pins 54 disposed in bores 56 through rails 48 and 50, the ends of each pin being seated in one of the slots 60 (later to be described) in segments 34. It will be apparent therefore that the segments 34 are aligned relative to one another and each segment 34 is restrained at its center from relative circumferential movement by the pins 54. However, relative expansion between adjacent segments 34 can occur at their adjacent ends 36 and 38. It will thus be apparent that during engine operation when the shroud structure becomes heated up, thermal expansion of the shroud structure in the radial direction will be limited but the segments 34 may expand in the circumferential direction relative to one another to permit thermal growth due to the increase in temperature. During such thermal expansion, the ends 36 and 38 of the adjacent segment 34 may move relative to one another in the circumferential direction to close the gaps 40 and 42, which gaps are provided to permit such relative circumferential expansion between adjacent segments 34. Cutout portions or slots 60 are provided in each segment 34 at its upstream and downstream edges in the axial direction through the segment portions 58 defining the outer walls of grooves 52 to permit the relatively hot portion of the shroud segment in contact with the hot gases to expand relatively freely in the circumferential direction and unrestrained by the cooler portions 58 comprising the supporting rail structure which are not in contact with the hot gases and would otherwise constitute stiffeners.

Means are also provided for directing cooling air over the radially outer surface of the shroud 30 for cooling said surface, thus minimizing the thermal expansion thereof. Again referring to FIG. 1, as explained above, the compressor 14 supplies air to the combustion chamber 18 for combustion therein. However, only a portion of the air supplied by the compressor 14 is used in the combustion process with the remainder of the air supply being directed around the combustion chamber into passages 62 in the radially outer side of the combustion chamber 18 and passages 64 at the radially inner side of the combustion chamber 18. Some of the air flowing through the passages 62 and 64 is recombined with the combustion gases as diluent air for cooling the combustion gases prior to entrance into the turbine stage of the engine in a known manner. Also, some of the air from the passages 62 and 64 is supplied to the interior of blades of the turbine section, including the stator and rotor blades, to provide a transpiration-type cooling of said blades. Reference may be made to copending applications Ser. No. 290,718, filed June 26, 1963, now Patent No. 3,224,194, and Ser. No. 466,390, filed June 23, 1965, which applications deal with such uses of the air such as that supplied by the passages 62 and 64.

Referring to FIG. 2, it will be seen by the arrows shown therein that some of the air from the cooling passage 62 is directed into a passageway 66 in the outer body wall 44 and into a passage 68 and a passage 70 in the outer body which passages communicate with an annular relatively narrow cooling passage 72 adjacent to the radially outer surface of the shroud 30. A baffle 74 which may be comprised of a lightweight packing material is radially spaced from the shroud 30 to define one side of the passageway 72 so that, as is shown in FIG. 2, the passageway 72 is relatively narrow as it passes over the radially outer surface of the shroud 30 to provide a scrubbing effect over said shroud outer surface. The passageway 72 communicates at its downstream end with a passageway 76 in the outer body wall 46 which in turn communicates with a chamber 78 wherein the cooling air may flow between wall 46 and a wall 80 of the exhaust nozzle so that the cooling air may be discharged into the main gas stream for discharge with said gases through said exhaust nozzle 28. Some of the air from passageway 72 also passes off through slot 60. Thus, the cooling air passing through the passageway 72 will cool the radially outer surface of the shroud 30 so as to minimize thermal growth of said shroud 30.

Since substantially the entire area of the rotor blades 22 is directly exposed to the hot gases discharged from the combustion chamber 18, the heating up of said blades 22 will be relatively more rapid than the heating up of the shroud 30. Further, since the tips 32 of the blades 22 are free and the shroud structure is restrained from growth in the radial direction, the blades 22 may expand in the radial direction relative to said shroud 30. Therefore, since the blades 22 may expand radially relative to the shroud 30, there may be some rubbing contact between the tips 32 of the blades 22 with the inner surface of the shroud 30. In order to prevent seizure of the blade tips with the inner surface of the shroud 30, the shroud structure is comprised of two layers 82 and 84 with the radially inner layer 82 being made of a relatively softer material than the radially outer layer 84. For example, the inner layer 82 may be made of a material known as Stellite 25 or some other suitable material. By use of a relatively softer material for the radially inner layer, the blade tips 32 may rub against said layer without causing the blade tips to seize with said layer 82 in that the blade tips are free to wear into said relatively softer material, if the growth in the radial direction should be such that the blade tips 32 require more room in the radial direction.

Referring to FIG. 4, it will be seen therein that the radially inner layer 82 is comprised of a honeycomb structure. Because the inner layer 82 is formed in a honeycomb structure and is a relatively softer material, this layer 82 is operably destructive by the blade tips 32 so that in the event the blade tips should dig into said structure, the digging in will not cause a seizure of the blades with the layer 82. It will be further seen, with particular reference to FIG. 4, that the honeycomb structure is oriented so that no side of any of the individual honeycombs is parallel to the direction of travel of the blade 22 at least when the axis of the blade is disposed parallel to the engine axis. Therefore, it can be seen that with reference to any point on the blade tip that traverses over a wall surface of the honeycomb structure, the point of the blade tip will not be in contact with a honeycomb wall surface for any substantial length of time of travel of the blade tip in the direction of the arrow B relative to the honeycomb surface. If, for example, the honeycomb structure were rotated 90 degrees from that shown in FIG. 4, the walls 82a and 82b would be parallel to the travel of the blade tip as shown by the arrow B and a point on the blade tip which would come in contact with a wall surface 82a or 82b would be in contact with said wall surface during a substantial length of time of the relative travel. In any event, the relative time of contact between the blade tip and the wall surface 82a or 82b would be substantially longer than in the configuration shown in FIG. 4. Because of the orientation of the honeycomb structure of the invention as it is illustrated in FIG. 4, during such time as when the blade tip may rub against the inner layer surface 82, the rate of wear of said inner surface 82 will be substantially minimized.

From the above detailed description it can be seen that a novel shroud structure is presented for the rotor blades in a gas turbine engine wherein radial expansion of the shroud structure relative to the blade tips is minimized so that the clearance between the shroud and the rotor blade tips does not become excessive throughout all operating conditions of the engine. Further, a novel structure for the shroud itself is presented which permits relative rubbing contact between the blade tips and the inner surface of the shroud without causing seizure of the blades with said shroud structure.

While the invention has been described in detail in its present preferred embodiment, it will be obvious to those skilled in the art after understanding the invention that various changes and modifications may be made therein without departing from the spirit or scope thereof.

What is claimed is:

1. In a gas turbine engine, a shroud structure for the rotor blades of said engine comprising in combination a pair of circular side rails mounted in said engine adjacent the tips of said rotor blades for engaging and positioning a shroud, an annular shroud surrounding said blade tips in close juxtaposition thereto, said shroud being formed of a plurality of arcuate segments circumferentially juxtaposed, each of said segments having at its circumferential ends portions overlapping adjacent segments with clearance between said segments for circumferential thermal expansion, each axial end face of each of said segments having an arcuate groove therein engaging one of said rails, each of said grooves being defined by a radially inner wall and a radially outer wall, said radially outer walls in each of said segments having a plurality of axially extending slots therein at least as deep as the depth of said groove in both radial and axial directions to prevent a stiffening effect by said outer walls and to allow free circumferential expansion of said segments, said shroud structure including passage means for directing cooling air across the radially outer surface of said segments and through said slots, said radially outer walls of said grooves having a greater diameter than the diameter of said annular shroud between said outer walls to provide a radially outwardly facing channel section to said shroud, and said passage means for cooling air including an annular baffle member surrounding said shroud and re-entrant within said channel section and restricting the air passage thereacross to provide a scrubbing action of the cooling air across said shroud.

2. The combination recited in claim 1, wherein the center portion of each of said arcuate segments is attached to at least one of said rails by a pin disposed in a bore through said rail and having its ends seated in one of said slots in said segment to allow thermal expansion of the ends of said segments in the circumferential direction, the engagement of said grooves with said rails restraining thermal expansion of said shroud in the radial direction.

References Cited

UNITED STATES PATENTS

| 2,634,090 | 4/1953 | Hardigg. |
| 2,638,743 | 5/1953 | Feilden. |
| 2,840,343 | 6/1958 | Brandt et al. |
| 2,858,104 | 10/1958 | Kelk et al. |
| 2,859,934 | 11/1958 | Halford et al. _____ 253—39.1 |
| 2,962,256 | 11/1960 | Bishop. |
| 2,963,307 | 12/1960 | Bobo. |
| 3,042,365 | 7/1962 | Curtis et al. |
| 3,004,700 | 10/1961 | Warren. |

EVERETTE A. POWELL, JR., *Primary Examiner.*

U.S. Cl. X.R.

253—39.1, 77